United States Patent
Kazem et al.

(10) Patent No.: US 12,197,463 B2
(45) Date of Patent: Jan. 14, 2025

(54) CREATING DESCRIPTORS FOR BUSINESS ANALYTICS APPLICATIONS

(71) Applicant: International Business Machines Corporation, Armonk, NY (US)

(72) Inventors: Firas Kazem, Kanata (CA); Laura Marie Alkhoury, Ottawa (CA); Anthony Nicola Tasca, Ottawa (CA); Ahmed Hussein Mohamed Kamel El-Khouly, Kanata (CA); Mohammed Mostafa, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 16/802,897

(22) Filed: Feb. 27, 2020

(65) Prior Publication Data
US 2021/0271637 A1  Sep. 2, 2021

(51) Int. Cl.
*G06F 16/26* (2019.01)
*G06F 40/284* (2020.01)

(52) U.S. Cl.
CPC ............ *G06F 16/26* (2019.01); *G06F 40/284* (2020.01)

(58) Field of Classification Search
CPC ...... G06F 16/26; G06F 16/248; G06F 40/284; G06F 40/30; G06F 40/20
See application file for complete search history.

(56) References Cited

U.S. PATENT DOCUMENTS

| | | |
|---|---|---|
| 7,885,918 B2 | 2/2011 | Statchuk |
| 9,058,409 B2 | 6/2015 | Chakra et al. |
| 9,275,122 B2 | 3/2016 | Lions |
| 10,049,141 B2 | 8/2018 | Prophete et al. |
| 2008/0065634 A1 | 3/2008 | Krinsky |
| 2012/0226626 A1 | 9/2012 | Venkateswaran et al. |
| 2015/0186806 A1 | 7/2015 | Hiltz-Laforge et al. |
| 2015/0199834 A1* | 7/2015 | Gibson ................ H04N 19/44 382/284 |
| 2019/0139061 A1 | 5/2019 | Sewak |
| 2019/0179829 A1* | 6/2019 | Nadler ................ G06T 11/206 |

* cited by examiner

*Primary Examiner* — Sanchita Roy
(74) *Attorney, Agent, or Firm* — Shackelford, McKinley & Norton, LLP; Robert A. Voigt, Jr.

(57) ABSTRACT

A computer-implemented method, system and computer program product for creating a descriptor for a dashboard template. The column-to-visualization mappings are extracted from a dashboard of a created or modified dashboard (or a created or modified dashboard template). Furthermore, the concept combinations from each visualization of the dashboard are extracted. Additionally, topics from the dashboard are extracted. The concept combinations, topics and column-to-visualization mappings are aggregated into a dashboard template descriptor. The dashboard template descriptor is then stored. In this manner, the dashboard template descriptor captures how concept combinations are used in the visualizations of the dashboard as well as how high-level concepts (topics) are incorporated in the dashboard. Furthermore, the dashboard template descriptor captures how the concepts of the columns of a dataset are mapped to the visualizations of the dashboard. As a result, the most appropriate dashboard/dashboard template may be selected to visualize the user's dataset.

25 Claims, 5 Drawing Sheets

CREATING DESCRIPTORS FOR BUSINESS ANALYTICS APPLICATIONS

TECHNICAL FIELD

The present invention relates generally to business analytics applications, and more particularly to creating descriptors for business analytics applications, such as dashboards, dashboard templates, reports and report templates.

BACKGROUND

Business analytics applications focus on developing new insights and understanding of business performance based on data and statistical methods. Typically, such applications involve the use of "dashboards." A dashboard is a user interface that organizes and presents information in a way that is easy to read. Furthermore, such dashboards may be interactive.

Currently, users may find it difficult to build a dashboard, such as a business analytics dashboard, to visualize their datasets. As a result, users may attempt to utilize an existing dashboard or dashboard template, such as by building from it. However, identifying the correct template for a dataset is a difficult task, especially since systems do not take into account the datasets that have been used with the templates and how they were used in the visualizations of the templates as discussed below. "Visualizations," as used herein, refer to the graphical elements of the dashboard, such as those graphical elements that depict information from the dataset.

For example, suppose a financial specialist ("F1") builds a dashboard for financial planning purposes with a popular dataset ("S1"). The financial specialist ("F1") then makes the dashboard's template ("D") available for others to reuse.

Suppose further that another financial specialist ("F2") is looking for a dashboard to visualize his/her dataset ("S2"). The system may recommend the dashboard template ("D") for a variety of reasons, such as being popular with financial specialists, meeting F2's style preferences and is indexed against "financial" concepts. However, the dataset S2 may not be best visualized with the dashboard template D for the following reasons: a visualization in dashboard template D requires a data type that is not available in dataset S2 (e.g., geographical locations); dataset S2's column concepts (such as those deemed interesting) may not be best visualized with dashboard template D (e.g., dashboard template D was used with dataset S1 to showcase the concepts of "profit" and "cost," but dataset S2 may be best visualized with a dashboard that showcases the concepts of current and target "revenue"); and dataset S2's concept combinations (such as those deemed interesting) may not be best visualized with dashboard template D (e.g., dataset S2 is best visualized with widgets showing "revenue by business" and "revenue by time"; whereas, dashboard template D contains widgets that best visualize "sales by product" and "profit by product").

As a result, there is not currently a means for identifying the most appropriate dashboard/dashboard template to visualize the user's dataset.

SUMMARY

In one embodiment of the present invention, a computer-implemented method for creating a descriptor for a dashboard template comprises extracting column-to-visualization mappings from a dashboard. The method further comprises extracting concept combinations from each visualization of the dashboard. The method additionally comprises extracting a list of topics from the dashboard. Furthermore, the method comprises aggregating the concept combinations, the list of topics and the column-to-visualization mappings into a dashboard template descriptor. Additionally, the method comprises storing the dashboard template descriptor in a database.

In another embodiment of the present invention, a computer program product for creating a descriptor for a dashboard template, the computer program product comprising one or more computer readable storage mediums having program code embodied therewith, the program code comprises the programming instructions for extracting column-to-visualization mappings from a dashboard. The program code further comprises the programming instructions for extracting concept combinations from each visualization of the dashboard. The program code additionally comprises the programming instructions for extracting a list of topics from the dashboard. Furthermore, the program code comprises the programming instructions for aggregating the concept combinations, the list of topics and the column-to-visualization mappings into a dashboard template descriptor. Additionally, the program code comprises the programming instructions for storing the dashboard template descriptor in a database.

In a further embodiment of the present invention, a system comprises a memory for storing a computer program for creating a descriptor for a dashboard template and a processor connected to the memory, where the processor is configured to execute the program instructions of the computer program comprising extracting column-to-visualization mappings from a dashboard. The program instructions of the computer program further comprise extracting concept combinations from each visualization of the dashboard. The program instructions of the computer program additionally comprise extracting a list of topics from the dashboard. Furthermore, the program instructions of the computer program comprise aggregating the concept combinations, the list of topics and the column-to-visualization mappings into a dashboard template descriptor. Additionally, the program instructions of the computer program comprise storing the dashboard template descriptor in a database.

In this manner, embodiments of the present invention capture how concept combinations are used in the visualizations of the dashboard as well as how high-level concepts (topics) are incorporated in the dashboard. Furthermore, embodiments of the present invention capture how the concepts of the columns of a dataset are mapped to the visualizations of the dashboard. As a result, the most appropriate dashboard/dashboard template may be selected to visualize the user's dataset.

Additionally, embodiments of the present invention for creating descriptors for dashboard templates, as discussed herein, may be used to create descriptors for other business analytics applications, such as dashboards, reports and report templates.

Furthermore, embodiments of the present invention capture and incorporate the high-level concepts (topics) of a dashboard template into a dashboard template descriptor.

Furthermore, embodiments of the present invention capture and incorporate the concepts used within individual visualizations of a dashboard template. For example, embodiments of the present invention utilize how combinations of concepts have been used within individual visualizations of a dashboard template. In another example, embodiments of the present invention incorporate column statistics and statistical analysis into the dashboard template descriptor for a more accurate reflection of how columns of a dataset are used with visualizations. In a further example, embodiments of the present invention handle modifications of dashboard template descriptors by inferring concepts from the system and contextual usage.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
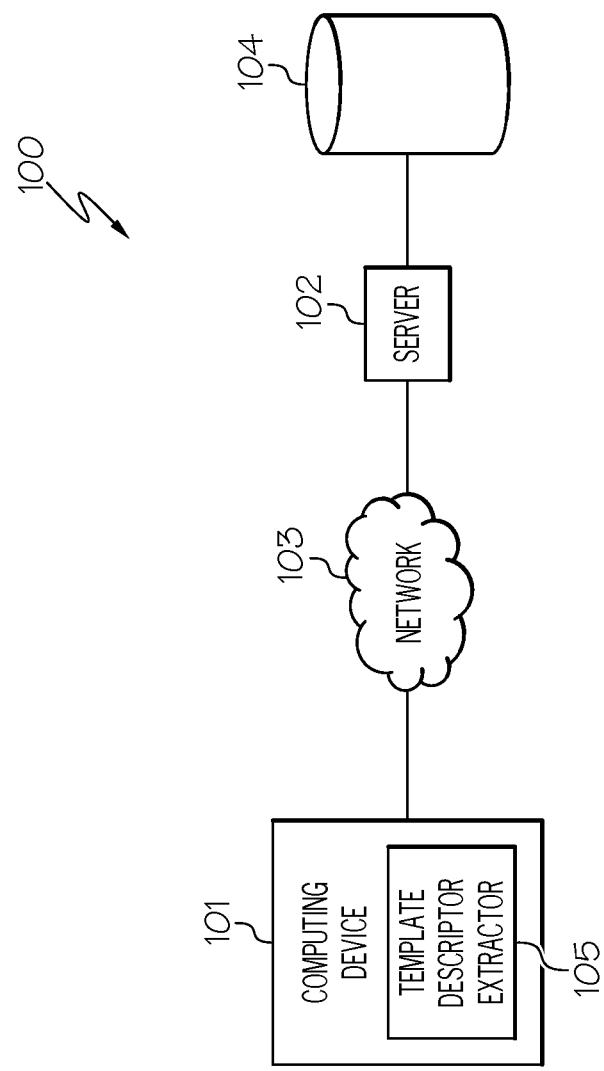
FIG. 1 illustrates a communication system for practicing the principles of the present invention in accordance with an embodiment of the present invention.

The present invention comprises a computer-implemented method, system and computer program product for creating a descriptor for a dashboard template. In one embodiment of the present invention, the column-to-visualization mappings are extracted from a dashboard of a created or modified dashboard (or a created or modified dashboard template). "Column-to-visualization mappings," as used herein, refer to how the concepts and statistics of the columns of the dataset are mapped to the visualizations depicted in the dashboard. For example, the concepts and statistics of the first column of the dataset may be mapped to a first portion of a visualization depicted in the dashboard and the concepts and statistics of the second column of the dataset may be mapped to a second portion of the visualization depicted in the dashboard. Furthermore, the concept combinations from each visualization of the dashboard (created or modified dashboard) (or the created or modified dashboard template) are extracted. "Concept combinations," as used herein, refer to the joint utilization of two or more concepts in a visualization of the dashboard. Additionally, topics from the dashboard (created or modified dashboard) (or the created or modified dashboard template) are extracted. A "topic," as used herein, refers to a high-level concept that is the subject of the context of a collection of visualizations of the dashboard. The concept combinations, topics and column-to-visualization mappings are aggregated into a dashboard template descriptor. The dashboard template descriptor is then stored, such as in a server database. In this manner, the dashboard template descriptor captures how concept combinations are used in the visualizations of the dashboard as well as how high-level concepts (topics) are incorporated in the dashboard. Furthermore, the dashboard template descriptor captures how the concepts of the columns of a dataset are mapped to the visualizations of the dashboard. As a result, the most appropriate dashboard/dashboard template may be selected to visualize the user's dataset.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses embodiments of the present invention creating descriptors for dashboard templates, the principles of the present invention may be used to create descriptors for other business analytics applications, such as dashboards, reports and report templates. A person of ordinary skill in the art would be capable of applying the principles of the present invention to such implementations. Further, embodiments applying the principles of the present invention to such implementations would fall within the scope of the present invention.

Referring now to the Figures in detail, FIG. 1 illustrates a communication system 100 for practicing the principles of the present invention in accordance with an embodiment of the present invention. Communication system 100 includes a computing device (also referred to as a "client device") 101 connected to a server 102 via a network 103. It is noted that both computing device 101 and the user of computing device 101 may be identified with element number 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102. A description of the hardware configuration of computing device 101 is provided below in connection with FIG. 2.

In one embodiment, server 102 is configured to store templates, such as dashboard templates, in a database 104 connected to server 102. Such dashboard templates may be associated with descriptors (also referred to herein as "dashboard template descriptors") which are also stored alongside their associated dashboard templates in database 104. In one embodiment, such dashboard template descriptors include metadata, such as concept combinations from each visualization of the dashboard of the template as well as topics (high-level concepts) of the visualizations of the dashboard and column-to-visualization mappings in the dashboard. As discussed further below, such "column-to-visualization" mappings refer to how the concepts and statistics of columns of the dataset are mapped to the visualizations depicted in the dashboard. Furthermore, as discussed below, such "concept combinations" refer to the joint utilization of two or more concepts (e.g., "profit" and "revenue") in a visualization of the dashboard. A more detailed discussion of the dashboard template descriptor is provided further below.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing device 101 includes a software agent, referred to herein as the "template descriptor extractor" 105, configured to create dashboard template descriptors for dashboard templates that may be used to identify the most appropriate dashboard template to visualize the user's dataset. In one embodiment, such a software agent utilizes the existing services and features of IBM® Cognos® Analytics, such as creating a template from an existing dashboard, where the dashboard template contains all the visualizations, layout and styling, but without the data sources.

Furthermore, IBM® Cognos® Analytics ("concept ontology registry" service) may be utilized by template descriptor extractor 105 to find relationships between different concepts by traversing a concept hierarchy.

Additionally, IBM® Cognos® Analytics (e.g., "smarts module" service) may be utilized by template descriptor extractor 105 to perform a deep analysis and knowledge discovery for the dataset to identify the ontological concepts of each column in the dataset, the statistics of each column (e.g., null density, distinct counts, minimum and maximum values), and the bivariate relationship strengths between the columns in the dataset.

Furthermore, IBM® Cognos® Analytics (e.g., "smarts semantic search" service) may be utilized by template descriptor extractor 105 to identify a list of related ontological concepts based on providing a phrase of text.

System 100 is not to be limited in scope to any one particular network architecture. System 100 may include any number of computing devices 101, servers 102, networks 103, databases 104 and template descriptor extractors 105.

Figure 2:
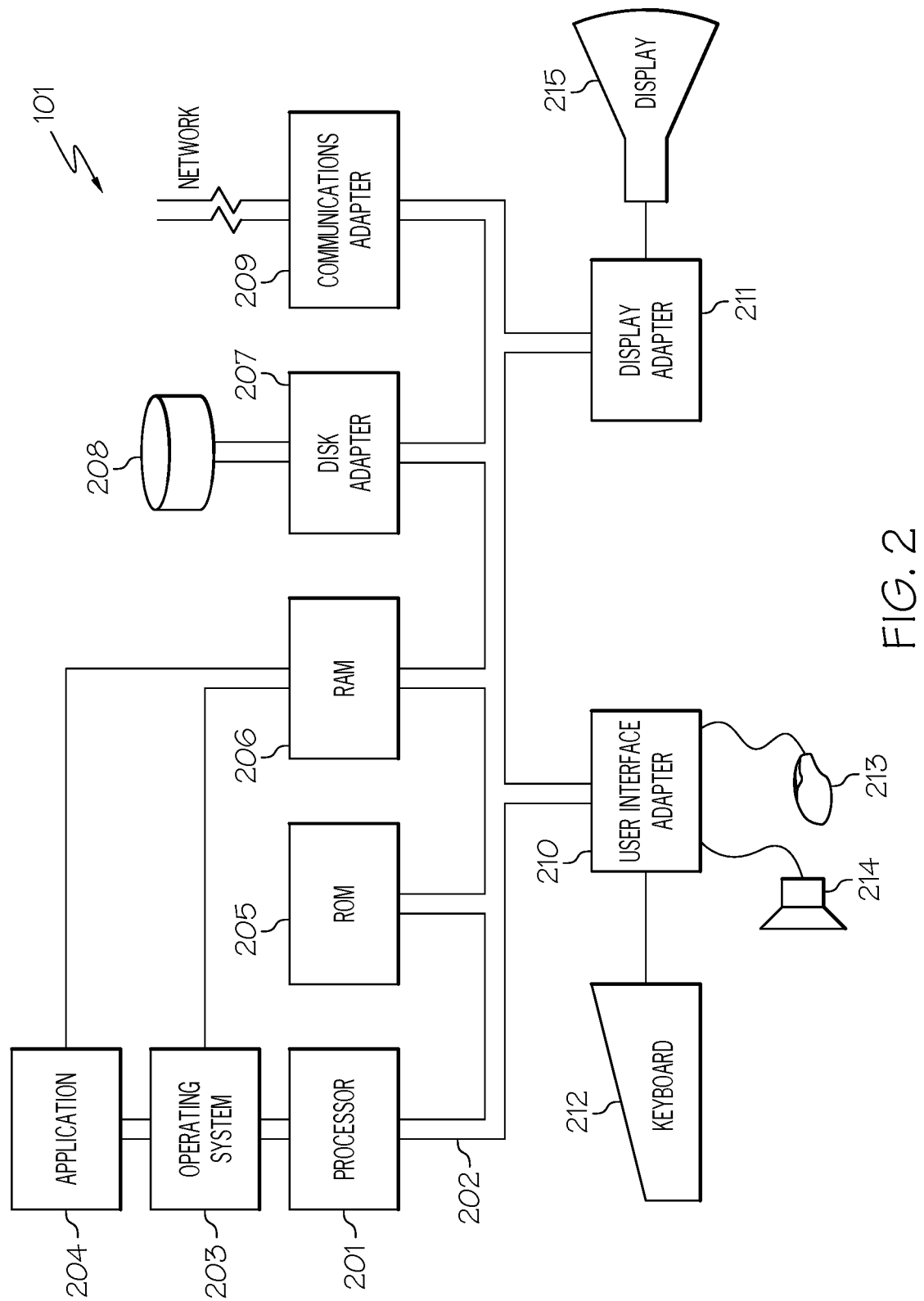
FIG. 2 illustrates an embodiment of the present invention of a hardware configuration of a computing device which is representative of a hardware environment for practicing the present invention

Referring now to FIG. 2, FIG. 2 illustrates an embodiment of the present invention of the hardware configuration of computing device 101 (FIG. 1) which is representative of a hardware environment for practicing the present invention. Referring to FIG. 2, computing device 101 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, template descriptor extractor 105 (FIG. 1) for creating dashboard template descriptors for dashboard templates as discussed further below in connection with FIGS. 3-6.

Referring again to FIG. 2, read-only memory ("ROM") 205 is connected to system bus 202 and includes a basic input/output system ("BIOS") that controls certain basic functions of computing device 101. Random access memory ("RAM") 206 and disk adapter 207 are also connected to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive.

Computing device 101 may further include a communications adapter 209 connected to bus 202. Communications adapter 209 interconnects bus 202 with an outside network (e.g., network 103 of FIG. 1) thereby enabling computing device 101 to communicate with other devices, such as server 102.

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, users may find it difficult to build a dashboard, such as a business analytics dashboard, to visualize their datasets. As a result, users may attempt to utilize an existing dashboard or dashboard template, such as by building from it. However, identifying the correct template for a dataset is a difficult task, especially since systems do not take into account the datasets that have been used with the templates and how they were used in the visualizations of the templates as discussed below. "Visualizations," as used herein, refer to the graphical elements of the dashboard, such as those graphical elements that depict information from the dataset. For example, suppose a financial specialist ("F1") builds a dashboard for financial planning purposes with a popular dataset ("S1"). The financial specialist ("F1") then makes the dashboard's template ("D") available for others to reuse. Suppose further that another financial specialist ("F2") is looking for a dashboard to visualize his/her dataset ("S2"). The system may recommend the dashboard template ("D") for a variety of reasons, such as being popular with financial specialists, meeting F2's style preferences and is indexed against "financial" concepts. However, the dataset S2 may not be best visualized with the dashboard template D for the following reasons: a visualization in dashboard template D requires a data type that is not available in dataset S2 (e.g., geographical locations); dataset S2's column concepts (such as those deemed interesting) may not be best visualized with dashboard template D (e.g., dashboard template D was used with dataset S1 to showcase the concepts of "profit" and "cost," but dataset S2 may be best visualized with a dashboard that showcases the concepts of current and target "revenue"); and dataset S2's concept combinations (such as those deemed interesting) may not be best visualized with dashboard template D (e.g., dataset S2 is best visualized with widgets showing "revenue by business" and "revenue by time"; whereas, dashboard template D contains widgets that best visualize "sales by product" and "profit by product"). As a result, there is not currently a means for identifying the most appropriate dashboard/dashboard template to visualize the user's dataset.

Figure 3:
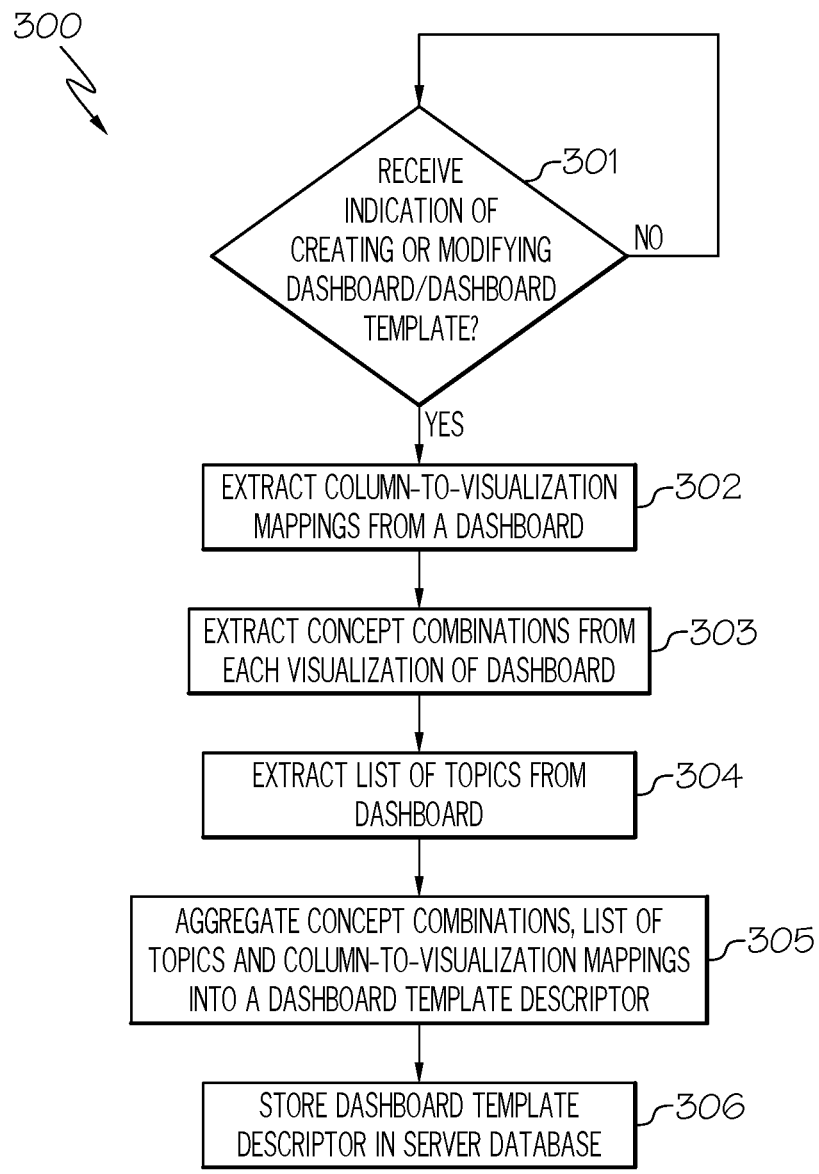
FIG. 3 is a flowchart of a method for creating a dashboard template descriptor for the dashboard template in accordance with an embodiment of the present invention.
Figure 4:
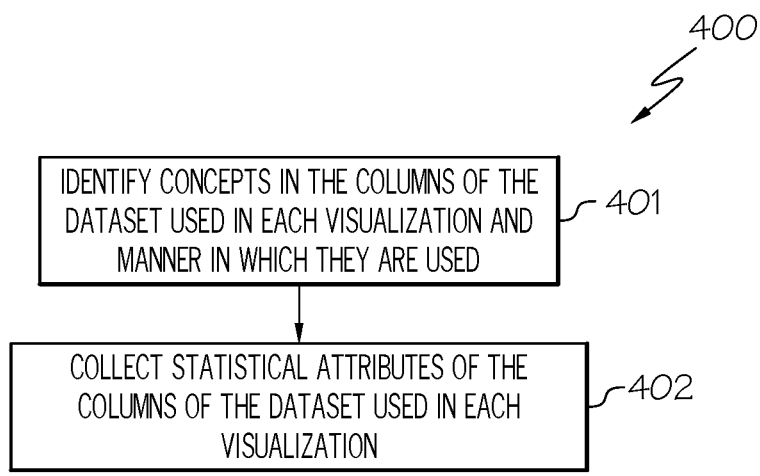
FIG. 4 is a flowchart of a method for extracting column-to-visualization mappings from a dashboard in accordance with an embodiment of the present invention.
Figure 5:
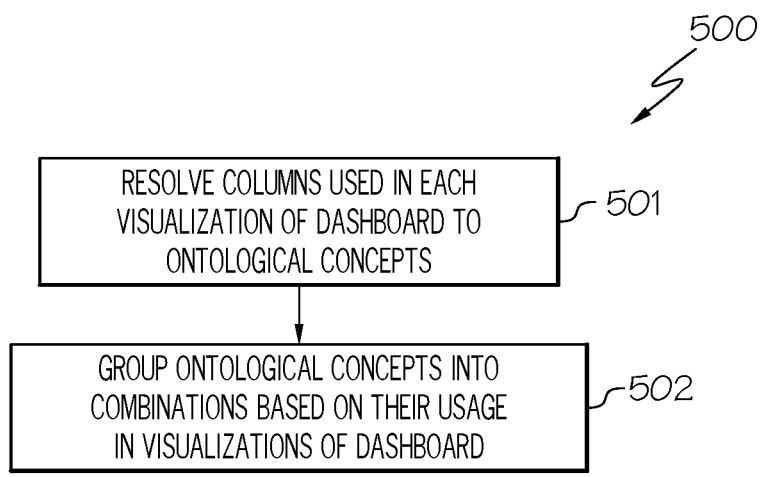
FIG. 5 is a flowchart of a method for extracting column combinations from each visualization of the dashboard in accordance with an embodiment of the present invention.
Figure 6:
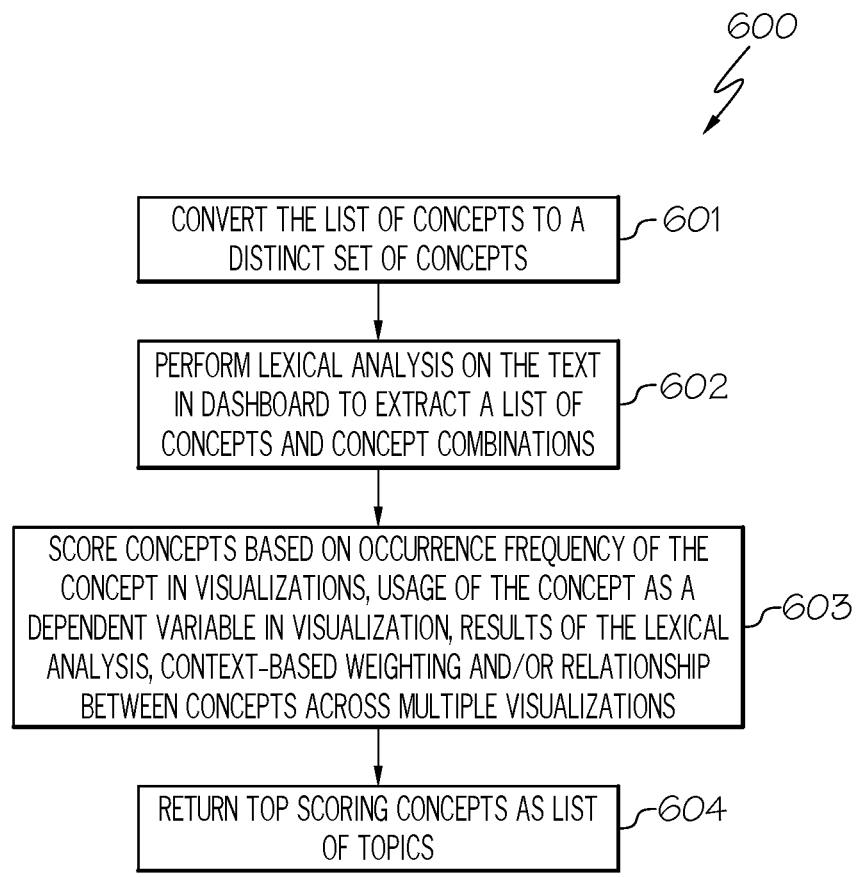
FIG. 6 is a flowchart of a method for extracting topics from the dashboard in accordance with an embodiment of the present invention.

The embodiments of the present invention provide a means for enabling the most appropriate dashboard/dashboard template to visualize the user's dataset to be identified by creating a descriptor ("dashboard template descriptor") for the dashboard template as discussed below in connection with FIGS. 3-6. FIG. 3 is a flowchart of a method for creating a dashboard template descriptor for the dashboard template. FIG. 4 is a flowchart of a method for extracting column-to-visualization mappings from a dashboard. FIG. 5 is a flowchart of a method for extracting column combinations from each visualization of the dashboard. FIG. 6 is a flowchart of a method for extracting topics from the dashboard.

As stated above, FIG. 3 is a flowchart of a method 300 for creating a dashboard template descriptor for the dashboard template in accordance with an embodiment of the present invention.

Referring to FIG. 3, in conjunction with FIGS. 1-2, in step 301, template descriptor extractor 105 determines whether it received an indication of creating or modifying a dashboard or dashboard template. For example, the user of computing device 101 may be in the process of creating or modifying a dashboard or dashboard template. Such creation or modification may be detected by template descriptor extractor 105 monitoring template files being created or modified, such as template files stored in database 104. Such template files may be identified by a unique file extension, such as the extension of .dot.

If template descriptor extractor 105 did not receive an indication of creating or modifying a dashboard or dashboard template, then template descriptor extractor 105 continues to determine whether it received an indication of creating or modifying a dashboard or dashboard template in step 301.

If, however, template descriptor extractor 105 received an indication of creating or modifying a dashboard or dashboard template, then, in step 302, template descriptor extractor 105 extracts the column-to-visualization mappings from a dashboard of the created or modified dashboard (or the created or modified dashboard template). "Column-to-visualization mappings," as used herein, refer to how the concepts and statistics of the columns of the dataset are mapped to the visualizations depicted in the dashboard. For example, the concepts and statistics of the first column of the dataset may be mapped to a first portion of a visualization depicted in the dashboard and the concepts and statistics of the second column of the dataset may be mapped to a second portion of the visualization depicted in the dashboard.

A discussion of an embodiment for extracting the column-to-visualization mappings from a dashboard of the created or modified dashboard (or the created or modified dashboard template) is provided below in connection with FIG. 4.

FIG. 4 is a flowchart of a method 400 for extracting column-to-visualization mappings from a dashboard in accordance with an embodiment of the present invention.

Referring to FIG. 4, in conjunction with FIGS. 1-3, in step 401, template descriptor extractor 105 identifies the concepts in the columns of the dataset used in each visualization and the manner in which they are used. In one embodiment, such concepts are identified using natural language processing. For example, terms, such as "profit" and "revenue," may be identified as "concepts" by template descriptor extractor 105 utilizing natural language processing. A "concept," as used herein, refers to an abstract idea or a general notion, such as a mental representation. In one embodiment, such concepts may be represented as objects, such as in a hierarchical ontology. In one embodiment, template descriptor extractor 105 identifies those concepts used in the visualizations that match those concepts represented in a hierarchical ontology. In one embodiment, such identified concepts are stored in a list of concepts.

Furthermore, in one embodiment, template descriptor extractor 105 identifies the manner in which the concepts are being used, such as being graphically displayed along a particular axis (e.g., x-axis).

For example, suppose a grouped column graph visualization of the dashboard displays "profit" values in the x-axis and "day of week" values in the y-axis and is grouped by "product types," then the column-to-visualization mappings will be:
{
{
    chart: "ColumnGraph",
    slot [
        "x-axis": ["Profit"],
        "y-axis": ["Day of Week"],
        "GroupedBy": [Product Type"],
    ]
}
}

In step 402, template descriptor extractor 105 collects the statistical attributes of the columns of the dataset used in each visualization. For example, template descriptor extractor 105 may collect the statistical attributes of the columns of the dataset used in each visualization using IBM® Cognos® Analytics (e.g., "smarts module" service). The statistical attributes may include null density, distinct counts, minimum and maximum values and bivariate relationship strengths between the columns of the dataset.

Returning to FIG. 3, in conjunction with FIGS. 1-2 and 4, in step 303, template descriptor extractor 105 extracts the concept combinations from each visualization of the dashboard (created or modified dashboard) (or the created or modified dashboard template). "Concept combinations," as used herein, refer to the joint utilization of two or more concepts in a visualization of the dashboard.

A discussion of an embodiment for extracting the concept combinations from each visualization of the dashboard (created or modified dashboard) (or the created or modified dashboard template) is provided below in connection with FIG. 5.

Referring to FIG. 5, FIG. 5 is a flowchart of a method 500 for extracting column combinations from each visualization of the dashboard in accordance with an embodiment of the present invention.

Referring to FIG. 5, in conjunction with FIGS. 1-4, in step 501, template descriptor extractor 105 resolves the columns in the dataset used in each visualization of the dashboard to ontological concepts. An "ontology," as used herein, refers to a representation, formal naming and definition of the categories, properties and relationships between the concepts. An "ontology concept," as used herein, refers to a concept in the ontology. Furthermore, "resolving," as used herein, refers to mapping the columns in the dataset used in the visualization of the dashboard to ontological concepts.

In one embodiment, such concepts are identified by template descriptor extractor 105 using IBM® Cognos® Analytics (e.g., "smarts semantic search" service) to identify a list of related ontological concepts based on providing a phrase of text, such as terms in the columns of the dataset.

In another embodiment, such concepts are identified using natural language processing. For example, terms in the columns of the dataset may be identified as ontological concepts by template descriptor extractor 105 utilizing natural language processing to identify those terms in the columns of the dataset that match the concepts (terms, such as "profit" and "revenue") listed in an ontology.

In one embodiment, a visualization may exist in a template without associated data columns. In such an embodiment, suitable concepts may be identified by leveraging system and user learning as well as industry knowledge to derive concepts associated with the visualization of the dashboard. Furthermore, the context in which the visualization is used in the template is analyzed and then related to the topic of the collection of visualizations (such as those in the dashboard) and neighboring visualizations (such as those nearby to the dashboard). A "topic," as used herein, refers to a high-level concept that is the subject of the context of a collection of visualizations.

In one embodiment, such topics are identified by template descriptor extractor 105 utilizing natural language processing to extract the meaning of the terms used in a collection of visualizations of the dashboard and neighboring visualizations. For example, the term "bat" in the dataset may be interpreted to mean a wooden club used in the game of baseball to strike a ball as opposed to a flying mammal since the terms "bat" and "baseball" are used in close proximity in the dataset.

Additionally, in one embodiment, a lexical analysis is performed on the text in the visualization to extract the concepts. A "lexical analysis," as used herein, refers to the process of converting a sequence of characters into a sequence of tokens (strings with an assigned and thus identified meaning).

In step 502, template descriptor extractor 105 groups the concepts of step 501 into combinations based on their usage in the visualizations of the dashboard. For example, if such concepts are utilized together in a group, then such concepts would be grouped. For instance, in a grouped column graph visualization that displays "profit" values in the x-axis and "day of week" values in the y-axis and is grouped by "product types," then one of the concept combinations of the dashboard template descriptor will be ["Profit," "Day of Week," "Product Types"].

Returning to FIG. 3, in conjunction with FIGS. 1-2 and 4-5, in step 304, template descriptor extractor 105 extracts the topics from the dashboard (created or modified dashboard) (or the created or modified dashboard template). As previously discussed, a "topic," as used herein, refers to a high-level concept that is the subject of the context of a collection of visualizations of the dashboard. In one embodiment, such topics are identified by template descriptor extractor 105 utilizing natural language processing to extract the meaning of the terms used in visualizations of the dashboard. For example, terms, such as "bat," "ball," "player," and "base," used in the visualizations of the dashboard may be analyzed by template descriptor extractor 105 to derive the topic ("baseball") of the visualizations using natural language processing. It is noted for clarity that more than one topic may be extracted from the dashboard, such as by identifying multiple topics for multiple visualizations in the dashboard.

A discussion of an embodiment for extracting the topics from the dashboard (created or modified dashboard) (or the created or modified dashboard template) is provided below in connection with FIG. 6.

FIG. 6 is a flowchart of a method 600 for extracting topics from the dashboard in accordance with an embodiment of the present invention.

Referring to FIG. 6, in conjunction with FIGS. 1-5, in step 601, template descriptor extractor 105 converts the list of concepts (discussed in step 401) to a distinct set of concepts.

For example, as discussed above, template descriptor extractor 105 identifies the concepts of the columns of the dataset used in each visualization and the manner in which they are used in step 401. Such identified concepts may be stored in a list, where such a list of concepts is converted to a distinct set of concepts. In one embodiment, such a conversion involves reducing the number of concepts in the list by combining those concepts that can be summarized by a distinct concept. For example, the concepts of "goods" and "merchandise" in the list of concepts may be summarized as corresponding to the distinct concept of "product" to be listed in the distinct set of concepts. A "distinct set of concepts," as used herein, refers to a list of concepts that includes a listing of a fewer number of concepts than in the list of concepts of step 401. In one embodiment, the distinct set of concepts is generated by template descriptor extractor 105 utilizing an ontological hierarchy that illustrates the relationships between concepts, including concepts that may be used to describe multiple other concepts. In one embodiment, template descriptor extractor 105 utilizes IBM® Cognos® Analytics ("concept ontology registry" service) to find relationships between different concepts by traversing a concept hierarchy. In such a concept hierarchy, the hierarchy may include different levels of concepts, such that each "child" concept (located on a lower level from a concept) may be summarized by a "parent" concept (located on a higher level from the child concept). For example, the concept of "product" may be a parent concept to the child concepts of "goods" and "merchandise" thereby indicating that the concepts of "goods" and "merchandise" may be summarized as corresponding to the distinct concept of "product." Hence, if template descriptor extractor 105 identifies the child concepts of "goods" and "merchandise" from the list of concepts (discussed in step 401) in the concept hierarchy, then template descriptor extractor 105 may identify the distinct concept of "product" that summarizes such child concepts. By template descriptor extractor 105 identifying concepts from the list of concepts (discussed in step 401) in such an ontological hierarchy, template descriptor extractor 105 may generate a shorter list of concepts (distinct set of concepts).

In step 602, template descriptor extractor 105 performs a lexical analysis on the text in the dashboard to extract a list of concepts and concept combinations. As discussed above, a "lexical analysis," as used herein, refers to the process of converting a sequence of characters into a sequence of tokens (strings with an assigned and thus identified meaning). Such lexical analysis may be performed on the text in the visualizations of the dashboard to extract concepts, which are stored in a list, as well as identify combinations of concepts that are utilized together. For example, in the text string "the quick brown fox jumps over the lazy dog," the 43 characters are converted into 9 tokens, which may be represented in s-expression as:

(sentence
    (word the)
    (word quick)
    (word brown)
    (word fox)
    (word jumps)
    (word over)
    (word the)
    (word lazy)
    (word dog))

Concepts may then be identified by template descriptor extractor 105 as discussed above utilizing natural language processing. Such concepts may be stored in a list. Furthermore, as discussed above, concept combinations may be identified based on the concepts being utilized jointly in a visualization of the dashboard.

In one embodiment, if a visualization of a dashboard has a title, then template descriptor extractor 105 utilizes natural language processing to distill the title to the concepts. For example, if the title is "Profit by Product Line," then template descriptor extractor 105 may distill the title to the concepts of "profit" and "product" and the concept combination of ["Profit", "Product Types"].

In step 603, template descriptor extractor 105 scores the concepts (concepts listed in the list of concepts of step 602 and in the distinct set of concepts of step 601) based on the occurrence frequency of the concept in the visualizations of the dashboard, usage of the concept as a dependent variable in the visualization of the dashboard, results of the lexical analysis, context-based weighting and/or relationship between concepts across multiple visualizations.

In one embodiment, such as a score is a scaled value between 0 and 1. In one embodiment, the higher the occurrence frequency of the concept in the visualizations of the dashboard, the higher the score of the concept and vice-versa.

In one embodiment, the greater the usage of the concept as a dependent variable in the visualization of the dashboard, the higher the score of the concept and vice-versa. A "dependent variable," as used herein, refers to the metric whose value is dependent on a controlled variable, and whose performance against the controlled variable is measured in the visualization of the dashboard. For instance, in the graph of profit over time, the concept of profit is a dependent variable as its performance is measured across the time dimension. Such an analysis may be performed by template descriptor extractor 105 to determine which concepts are important in the visualization.

In one embodiment, the results of the lexical analysis (step 602) may be used to determine the score of the concept based on the concept combinations, such as by scoring such concepts higher than those that are not able to be combined with other concepts.

In one embodiment, context-based weighting involves associating a higher weight or score to the concepts based on the location of the concepts in the visualizations of the dashboard. For example, a concept extracted from the title (e.g., tab title, page title) may be weighted higher (scored higher) than the concept extracted from the text of the label widgets.

In another embodiment, concepts used in visualizations occupying "prime real estate" (more valuable area of the dashboard) in the dashboard may have a higher weight (score).

In another embodiment, topics may be analyzed across the whole dashboard, across a tab/page, across a collection of charts or within a single chart.

With respect to relationships between concepts across multiple visualizations, in one embodiment, such relationships involve determining ancestors and influencers of the concepts in an ontological hierarchy. For example, a dashboard tab may have visualizations showing "net profit," "gross profit," and "cost." The topic of the tab may be "profit" since it is an ancestor of the concepts of "net profit" and "gross profit" and since it is an influencer of "cost." Those concepts in the list of concepts (list of concepts of step 602, distinct set of concepts of step 601) that are ancestors and influencers to other concepts in the list may be assigned a higher score than other concepts.

In step 604, template descriptor extractor 105 returns the top scoring concepts as the list of topics (list of topics extracted in step 304). In one embodiment, template descriptor extractor 105 may return a user-designated number of concepts, such as the top 20 scoring concepts, as the list of topics.

Returning to FIG. 3, in conjunction with FIGS. 1-2 and 4-6, in step 305, template descriptor extractor 105 aggregates the concept combinations, list of topics and column-to-visualization mappings into a dashboard template descriptor.

In this manner, the dashboard template descriptor captures how concept combinations are used in the visualizations of the dashboard as well as how high-level concepts (topics) are incorporated in the dashboard. Furthermore, the dashboard template descriptor captures how the concepts and statistics of the columns of a dataset are mapped to the visualizations of the dashboard. As a result, the most appropriate dashboard/dashboard template may be selected to visualize the user's dataset as discussed further below.

In step 306, template descriptor extractor 105 stores the dashboard template descriptor in server database 104. In one embodiment, the dashboard template descriptor may be stored alongside the layout and visual metadata of the template.

An example of an embodiment of the dashboard template descriptor containing the aggregated concept combinations, topics and column-to-visualization mappings is provided below.

```
{
  {
    topic: ["Product Line"],
    conceptCombinations: [
       ["Revenue", "Product Line"],
       ["Sentiment", "Product Line"],
       ["Revenue", "Region"],
       ["Sentiment", "Region"]
    ],
    columnMappings: [
       chart: "ColumnGraph",
       slot: [
          "x-axis": ["Profit"],
          "y-axis": [Day of Week],
          "GroupedBy": ["Product Type"],
       ],
       Statistics: []
    ]
  }
}
```

After storage of the dashboard template descriptor in database 104, such descriptors may be utilized to identify the most appropriate dashboard/dashboard template to visualize the user's dataset as discussed below.

In one embodiment, the dataset may be received and analyzed by server 102 for identifying concepts (e.g., ontological concepts), including the concepts of the columns of the dataset. For example, terms, such as "profit" and "revenue," may be identified as "concepts" by utilizing natural language processing. In one embodiment, such concepts may be represented as objects, such as in a hierarchical ontology. In one embodiment, server 102 identifies those concepts used in the dataset that match those concepts represented in a hierarchical ontology.

In one embodiment, server 102 recommends the dashboard template that is most appropriate for visualizing the user's dataset utilizing the identified concepts of the dataset and dashboard template descriptors, such as by presenting the most appropriate dashboard template to the user via the user interface of computing device 101. In one embodiment, such a recommendation is based on one or more of the following factors discussed below.

For example, in one embodiment, such a recommendation is based on how closely such identified concepts match available concept combinations of the dashboard template obtained from the associated dashboard template descriptor. The greater the match, the more likely such a template will be recommended.

For example, if the concepts of "profit," "day of week" and "product types" were identified in the dataset, and the concept combination of the dashboard template descriptor was ["Profit," "Day of Week," "Product Types"], then such a match would increase the likelihood that the associated template will be recommended to visualize the user's dataset.

In one embodiment, such a recommendation is based on how closely the concepts (concepts previously identified) match the topics contained in the dashboard template descriptors. Such matching may involve identifying topics contained in the dashboard template descriptors that are the ancestors and influencers of the concepts (concepts previously identified) as identified in ontological hierarchies. Such a match would increase the likelihood that the associated template will be recommended to visualize the user's dataset.

In one embodiment, such a recommendation is based on the distance between the concepts (concepts previously identified) in the ontological hierarchy. In one embodiment, such a distance results in a score (e.g., scaled score between 0 and 1), which may be matched against scores of the concepts of the concept combinations contained in the dashboard template descriptors. The more closely such scores match, the greater the likelihood that the associated template will be recommended to visualize the user's dataset.

In one embodiment, such a recommendation is based on the compatibility between column-to-visualization mappings of the dashboard. For example, server 102 determines whether the concepts of the columns of the dataset (previously obtained) are included in the concepts of the column-to-visualization mappings of the dashboard contained in the dashboard template descriptors. Such a match would increase the likelihood that the associated template will be recommended to visualize the user's dataset.

In one embodiment, the template descriptor can be used for more than matching a dataset to a template, such as for comparing two templates, two dashboards or a template and a dashboard.

In an alternative embodiment, only the dashboard template descriptors are saved in database 104 and the corresponding dashboard templates are created automatically after selection of the dashboard template descriptor discussed above.

In an alternative embodiment, the dashboard template descriptor is augmented based on learning from the usage within the system. For example, template descriptor extractor 105 may aggregate and consolidate the learnings from the various dashboard template descriptors, and based on such knowledge, update the applicable dashboard template descriptors accordingly.

As a result of the foregoing, embodiments of the present invention capture and incorporate the high-level concepts (topics) of a dashboard template into a dashboard template descriptor. Consequently, hierarchical and influential relationships between concepts when determining the topic of a collection of visualizations are accounted.

Furthermore, embodiments of the present invention capture and incorporate the concepts used within individual visualizations of a dashboard template. For example, embodiments of the present invention utilize how combinations of concepts have been used within individual visualizations of a dashboard template. In another example, embodiments of the present invention incorporate column statistics and statistical analysis into the dashboard template descriptor for more accurate reflection of how columns of a dataset are used with visualizations. In a further example, embodiments of the present invention handle modifications of dashboard templates by inferring concepts from the system and contextual usage.

Additionally, the embodiments of the present invention capture how concept combinations are used in the visualizations of the dashboard as well as how high-level concepts (topics) are incorporated in the dashboard. Furthermore, embodiments of the present invention capture how the concepts of the columns of a dataset are mapped to the visualizations of the dashboard. As a result, the most appropriate dashboard/dashboard template may be selected to visualize the user's dataset.

Furthermore, the present invention improves the technology or technical field involving business analytics applications. As discussed above, currently, users may find it difficult to build a dashboard, such as a business analytics dashboard, to visualize their datasets. As a result, users may attempt to utilize an existing dashboard or dashboard template, such as by building from it. However, identifying the correct template for a dataset is a difficult task, especially since systems do not take into account the datasets that have been used with the templates and how they were used in the visualizations of the templates as discussed below. "Visualizations," as used herein, refer to the graphical elements of the dashboard, such as those graphical elements that depict information from the dataset. For example, suppose a financial specialist ("F1") builds a dashboard for financial planning purposes with a popular dataset ("S1"). The financial specialist ("F1") then makes the dashboard's template ("D") available for others to reuse. Suppose further that another financial specialist ("F2") is looking for a dashboard to visualize his/her dataset ("S2"). The system may recommend the dashboard template ("D") for a variety of reasons, such as being popular with financial specialists, meeting F2's style preferences and is indexed against "financial" concepts. However, the dataset S2 may not be best visualized with the dashboard template D for the following reasons: a visualization in dashboard template D requires a data type that is not available in dataset S2 (e.g., geographical locations); dataset S2's column concepts (such as those deemed interesting) may not be best visualized with dashboard template D (e.g., dashboard template D was used with dataset S1 to showcase the concepts of "profit" and "cost," but dataset S2 may be best visualized with a dashboard that showcases the concepts of current and target "revenue"); and dataset S2's concept combinations (such as those deemed interesting) may not be best visualized with dashboard template D (e.g., dataset S2 is best visualized with widgets showing "revenue by business" and "revenue by time"; whereas, dashboard template D contains widgets that best visualize "sales by product" and "profit by product"). As a result, there is not currently a means for identifying the most appropriate dashboard/dashboard template to visualize the user's dataset.

Embodiments of the present invention improve such technology by extracting the column-to-visualization mappings from a dashboard of a created or modified dashboard (or a created or modified dashboard template). "Column-to-visualization mappings," as used herein, refer to how the concepts and statistics of the columns of the dataset are mapped to the visualizations depicted in the dashboard. For example, the concepts and statistics of the first column of the dataset may be mapped to a first portion of a visualization depicted in the dashboard and the concepts and statistics of the second column of the dataset may be mapped to a second portion of the visualization depicted in the dashboard. Furthermore, the concept combinations from each visualization of the dashboard (created or modified dashboard) (or the created or modified dashboard template) are extracted. "Concept combinations," as used herein, refer to the joint utilization of two or more concepts in a visualization of the dashboard. Additionally, topics from the dashboard (created or modified dashboard) (or the created or modified dashboard template) are extracted. A "topic," as used herein, refers to a high-level concept that is the subject of the context of a collection of visualizations of the dashboard. The concept combinations, topics and column-to-visualization mappings are aggregated into a dashboard template descriptor. The dashboard template descriptor is then stored, such as in a server database. In this manner, the dashboard template descriptor captures how concept combinations are used in the visualizations of the dashboard as well as how high-level concepts (topics) are incorporated in the dashboard. Furthermore, the dashboard template descriptor captures how the concepts of the columns of a dataset are mapped to the visualizations of the dashboard. In this manner, the most appropriate dashboard/dashboard template may be selected to visualize the user's dataset. Furthermore, in this manner, there is an improvement in the technical field of business analytics applications.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

In one embodiment of the present invention, a computer-implemented method for creating a descriptor for a dashboard template comprises extracting column-to-visualization mappings from a dashboard. The method further comprises extracting concept combinations from each visualization of the dashboard. The method additionally comprises extracting a list of topics from the dashboard. Furthermore, the method comprises aggregating the concept combinations, the list of topics and the column-to-visualization mappings into a dashboard template descriptor. Additionally, the method comprises storing the dashboard template descriptor in a database.

In one embodiment, the method further comprises identifying concepts in columns of a dataset used in each visualization of the dashboard and collecting statistical attributes of the columns of the dataset used in each visualization of the dashboard.

In one embodiment, the method additionally comprises resolving columns used in each visualization of the dashboard to ontological concepts and grouping the ontological concepts into combinations based on their usage in visualizations of the dashboard.

Furthermore, in one embodiment, the method additionally comprises identifying concepts in columns of a dataset used in each visualization of the dashboard to form a list of concepts and converting the list of concepts to a distinct set of concepts.

Additionally, in one embodiment, the method further comprises performing a lexical analysis on text in the dashboard to extract a second list of concepts and concept combinations.

In one embodiment, the method further comprises scoring concepts listed in the second list of concepts and in the distinct set of concepts based on one or more of the following: occurrence frequency of a concept in visualizations of the dashboard, usage of a concept in a visualization of the dashboard, results of the lexical analysis, context-based weighting and relationships between concepts across multiple visualizations.

In one embodiment, the method additionally comprises returning concepts with a score above a threshold value as corresponding to the list of topics extracted from the dashboard.

Furthermore, in one embodiment, the method additionally comprises storing the dashboard template descriptor alongside layout and visual metadata.

Additionally, in one embodiment, the method further comprises extracting column-to-visualization mappings from the dashboard in response to receiving an indication of creating or modifying the dashboard or the dashboard template.

Other forms of the embodiments of the method described above are in a system and in a computer program product.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for creating a descriptor for a dashboard template, the method comprising:
    extracting column-to-visualization mappings from a dashboard;
    extracting concept combinations from each visualization of said dashboard;
    extracting a list of topics from said dashboard;
    aggregating said concept combinations, said list of topics and said column-to-visualization mappings into a dashboard template descriptor; and
    storing said dashboard template descriptor in a database.

2. The method as recited in claim 1 further comprising:
    identifying concepts in columns of a dataset used in each visualization of said dashboard; and
    collecting statistical attributes of said columns of said dataset used in each visualization of said dashboard.

3. The method as recited in claim 1 further comprising:
    resolving columns used in each visualization of said dashboard to ontological concepts; and
    grouping said ontological concepts into combinations based on their usage in visualizations of said dashboard.

4. The method as recited in claim 1 further comprising:
identifying concepts in columns of a dataset used in each visualization of said dashboard to form a list of concepts; and
converting said list of concepts to a distinct set of concepts.

5. The method as recited in claim 4 further comprising:
performing a lexical analysis on text in said dashboard to extract a second list of concepts and concept combinations.

6. The method as recited in claim 5 further comprising:
scoring concepts listed in said second list of concepts and in said distinct set of concepts based on one or more of the following: occurrence frequency of a concept in visualizations of said dashboard, usage of a concept in a visualization of said dashboard, results of said lexical analysis, context-based weighting and relationships between concepts across multiple visualizations.

7. The method as recited in claim 6 further comprising:
returning concepts with a score above a threshold value as corresponding to said list of topics extracted from said dashboard.

8. The method as recited in claim 1 further comprising:
storing said dashboard template descriptor alongside layout and visual metadata.

9. The method as recited in claim 1 further comprising:
extracting column-to-visualization mappings from said dashboard in response to receiving an indication of creating or modifying said dashboard or said dashboard template.

10. A computer program product for creating a descriptor for a dashboard template, the computer program product comprising one or more computer readable storage mediums having program code embodied therewith, the program code comprising the programming instructions for:
extracting column-to-visualization mappings from a dashboard;
extracting concept combinations from each visualization of said dashboard;
extracting a list of topics from said dashboard;
aggregating said concept combinations, said list of topics and said column-to-visualization mappings into a dashboard template descriptor; and
storing said dashboard template descriptor in a database.

11. The computer program product as recited in claim 10, wherein the program code further comprises the programming instructions for:
identifying concepts in columns of a dataset used in each visualization of said dashboard; and
collecting statistical attributes of said columns of said dataset used in each visualization of said dashboard.

12. The computer program product as recited in claim 10, wherein the program code further comprises the programming instructions for:
resolving columns used in each visualization of said dashboard to ontological concepts; and
grouping said ontological concepts into combinations based on their usage in visualizations of said dashboard.

13. The computer program product as recited in claim 10, wherein the program code further comprises the programming instructions for:
identifying concepts in columns of a dataset used in each visualization of said dashboard to form a list of concepts; and
converting said list of concepts to a distinct set of concepts.

14. The computer program product as recited in claim 13, wherein the program code further comprises the programming instructions for:
performing a lexical analysis on text in said dashboard to extract a second list of concepts and concept combinations.

15. The computer program product as recited in claim 14, wherein the program code further comprises the programming instructions for:
scoring concepts listed in said second list of concepts and in said distinct set of concepts based on one or more of the following: occurrence frequency of a concept in visualizations of said dashboard, usage of a concept in a visualization of said dashboard, results of said lexical analysis, context-based weighting and relationships between concepts across multiple visualizations.

16. The computer program product as recited in claim 15, wherein the program code further comprises the programming instructions for:
returning concepts with a score above a threshold value as corresponding to said list of topics extracted from said dashboard.

17. The computer program product as recited in claim 10, wherein the program code further comprises the programming instructions for:
storing said dashboard template descriptor alongside layout and visual metadata.

18. A system, comprising:
a memory for storing a computer program for creating a descriptor for a dashboard template; and
a processor connected to said memory, wherein said processor is configured to execute the program instructions of the computer program comprising:
extracting column-to-visualization mappings from a dashboard;
extracting concept combinations from each visualization of said dashboard;
extracting a list of topics from said dashboard;
aggregating said concept combinations, said list of topics and said column-to-visualization mappings into a dashboard template descriptor; and
storing said dashboard template descriptor in a database.

19. The system as recited in claim 18, wherein the program instructions of the computer program further comprise:
identifying concepts in columns of a dataset used in each visualization of said dashboard; and
collecting statistical attributes of said columns of said dataset used in each visualization of said dashboard.

20. The system as recited in claim 18, wherein the program instructions of the computer program further comprise:
resolving columns used in each visualization of said dashboard to ontological concepts; and
grouping said ontological concepts into combinations based on their usage in visualizations of said dashboard.

21. The system as recited in claim 18, wherein the program instructions of the computer program further comprise:
identifying concepts in columns of a dataset used in each visualization of said dashboard to form a list of concepts; and
converting said list of concepts to a distinct set of concepts.

22. The system as recited in claim 21, wherein the program instructions of the computer program further comprise:
   performing a lexical analysis on text in said dashboard to extract a second list of concepts and concept combinations.

23. The system as recited in claim 22, wherein the program instructions of the computer program further comprise:
   scoring concepts listed in said second list of concepts and in said distinct set of concepts based on one or more of the following: occurrence frequency of a concept in visualizations of said dashboard, usage of a concept in a visualization of said dashboard, results of said lexical analysis, context-based weighting and relationships between concepts across multiple visualizations.

24. The system as recited in claim 23, wherein the program instructions of the computer program further comprise:
   returning concepts with a score above a threshold value as corresponding to said list of topics extracted from said dashboard.

25. The system as recited in claim 18, wherein the program instructions of the computer program further comprise:
   storing said dashboard template descriptor alongside layout and visual metadata.

* * * * *